United States Patent
Haas (10) Patent No.: US 10,906,148 B2
(45) Date of Patent: Feb. 2, 2021

(54) MICROLUBRICATION SYSTEM

(71) Applicant: Bielomatik Leuze GmbH + Co. KG, Neuffen (DE)

(72) Inventor: Reiner Haas, Metzingen (DE)

(73) Assignee: BIELOMATIK SCHMIERTECHNIK GMBH, Frickenhausen (DE)

( * ) Notice: Subject to any disclaimer, the term of this patent is extended or adjusted under 35 U.S.C. 154(b) by 463 days.

(21) Appl. No.: 15/570,796

(22) PCT Filed: Apr. 28, 2016

(86) PCT No.: PCT/EP2016/000688
§ 371 (c)(1),
(2) Date: Oct. 31, 2017

(87) PCT Pub. No.: WO2016/177455
PCT Pub. Date: Nov. 10, 2016

(65) Prior Publication Data
US 2018/0085874 A1    Mar. 29, 2018

(30) Foreign Application Priority Data

May 5, 2015   (DE) .......................... 10 2015 005 634

(51) Int. Cl.
| | | |
|---|---|---|
| *B23Q 11/10* | (2006.01) | |
| *F16N 7/32* | (2006.01) | |
| *F16N 27/00* | (2006.01) | |

(52) U.S. Cl.
CPC ........ *B23Q 11/103* (2013.01); *B23Q 11/1023* (2013.01); *B23Q 11/1046* (2013.01); *F16N 7/32* (2013.01); *F16N 27/00* (2013.01); *Y02P 70/10* (2015.11)

(58) Field of Classification Search
CPC .............. B23Q 11/103; B23Q 11/1046; B23Q 11/1023; F16N 7/32; F16N 27/00; Y02P 70/169
USPC ........................................................ 184/6.14
See application file for complete search history.

(56) References Cited

U.S. PATENT DOCUMENTS

| | | | | |
|---|---|---|---|---|
| 4,527,661 | A | * | 7/1985 | Johnstone ............... F16N 29/00 184/6.1 |
| 5,857,812 | A | | 1/1999 | Stahl |
| 6,436,021 | B2 | * | 8/2002 | Nukui .................... B23Q 3/155 184/6.14 |
| 6,623,251 | B2 | * | 9/2003 | Nawamoto .............. B23Q 1/70 184/6.14 |

(Continued)

FOREIGN PATENT DOCUMENTS

| | | |
|---|---|---|
| CN | 101 311 515 A | 11/2008 |
| CN | 101657714 A | 2/2010 |

(Continued)

*Primary Examiner* — Michael R Mansen
*Assistant Examiner* — Mark K Buse
(74) *Attorney, Agent, or Firm* — Schroeder Intellectual Property Law Group, LLC (57) ABSTRACT

A microlubrication system for a machining unit with a rotating spindle, the system having a rotary feedthrough via which compressed air and lubricant can be fed to the rotating spindle to combine them in a mixing chamber close to a tool, and a metering valve by means of which the amount of the fed lubricant can be dosed. In order to improve the monitoring and the control of the system, the rotary feedthrough and/or the metering valve are designed as smart components.

7 Claims, 11 Drawing Sheets

(56) References Cited

U.S. PATENT DOCUMENTS

| | | | |
|---|---|---|---|
| 7,493,988 B2 * | 2/2009 | Urban | B23Q 11/10 184/55.1 |
| 7,665,578 B2 * | 2/2010 | Grozinger | B23Q 11/1046 184/50.2 |
| 7,929,136 B2 * | 4/2011 | Makiyama | B23Q 11/1046 356/337 |
| 7,997,385 B2 * | 8/2011 | Yanohara | F16C 33/6625 184/6.1 |
| 8,047,302 B2 * | 11/2011 | Berger | B25D 17/24 173/1 |
| 8,528,390 B2 | 9/2013 | Von Meduna et al. | |
| 8,695,763 B2 * | 4/2014 | Haas | B23Q 11/123 184/6.14 |
| 8,790,053 B2 * | 7/2014 | Makiyama | B23Q 11/10 408/56 |
| 8,934,998 B1 * | 1/2015 | Boelkins | B23Q 11/1046 700/159 |
| 2003/0103827 A1 | 6/2003 | Moller et al. | |
| 2007/0057083 A1 | 3/2007 | Bolz | |
| 2008/0319584 A1 | 12/2008 | Fischer et al. | |
| 2012/0093605 A1 * | 4/2012 | Haas | B23Q 11/10 409/136 |
| 2013/0320894 A1 * | 12/2013 | Hsu | H02P 6/34 318/400.21 |
| 2013/0340222 A1 | 12/2013 | Römpp | |
| 2018/0045196 A1 * | 2/2018 | Rampen | F16K 37/0041 |

FOREIGN PATENT DOCUMENTS

| | | |
|---|---|---|
| CN | 102345487 A | 2/2012 |
| CN | 103 442 848 A | 12/2013 |
| DE | 197 25 345 A1 | 12/1998 |
| DE | 101 32 857 A1 | 1/2003 |
| DE | 103 49 642 A1 | 5/2005 |
| DE | 10 2004 034 689 A1 | 8/2005 |
| DE | 20 2009 017 542 U1 | 6/2011 |
| JP | H10-505009 A | 5/1998 |
| JP | H11-129496 A | 5/1999 |
| JP | 2000-198043 A | 7/2000 |
| JP | 2002-066871 A | 3/2002 |
| JP | 2003-071681 A | 3/2003 |
| JP | 2004-501777 A | 1/2004 |
| JP | 2004-136411 A | 5/2004 |
| JP | 2007-508930 A | 4/2007 |
| JP | 2014-025482 A | 2/2014 |
| WO | 03/070382 A1 | 8/2003 |

\* cited by examiner

MICROLUBRICATION SYSTEM

RELATED APPLICATIONS

This application is a national phase of International Patent Application No. PCT/EP2016/000688 filed Apr. 28, 2016, which claims the filing benefit of German Patent Application No. 10 2015 005 634.4 filed May 5, 2015, the contents of both of which are incorporated herein by reference.

BACKGROUND OF THE INVENTION

1. Field of the Invention

The invention relates to a microlubrication system for a machining unit having a rotating spindle, in particular for machining workpieces, comprising
 a) a rotary feedthrough, via which compressed air and lubricant can be fed to the rotating spindle of the machining unit in order to combine them in a mixing chamber close to a tool, and
 b) a metering valve, with which the quantity of the lubricant fed can be metered.

The invention furthermore relates to a method for operating a microlubrication system for a machining unit.

2. Description of the Prior Art

In the field of manual and industrial manufacturing, the machining of workpieces for shaping purposes is assigned a considerable importance. Corresponding methods, such as for example milling, drilling, grinding, turning and the like, are employed in this respect for an extremely wide variety of materials, in particular metallic materials such as steel.

It is often necessary in machining methods to lubricate and/or to cool the contact surface between workpiece and tool with the aid of a lubricant (usually oil with various additives; hereinbelow, the terms "lubricant" and "oil" are used synonymously).

To this end, use is increasingly being made of microlubrication systems, which introduce the lubricant with the aid of compressed air usually through the tool into the cutting region of the machining unit. This has advantages over conventional lubrication using lubricant/water emulsions, since the lubricating action of emulsions is lower. Therefore, in the case of microlubrication, considerably smaller quantities of lubricant are required and even better cutting results are achieved with a higher throughput. In addition, the chips which form are contaminated to a lesser degree with lubricant.

Systems of this type are known, for example, from DE 197 25 345 A1 and DE 103 49 642 A1.

A disadvantage of the microlubrication systems known to date, however, is their comparatively high outlay on apparatus for controlling and monitoring a constant lubricant-to-air ratio. Thus, for example, the oil pressure and the temperature have to be kept constant with a high outlay on apparatus. Moreover, changes in the viscosity of different lubricants have to be compensated for by calibration.

SUMMARY OF THE INVENTION

It is therefore an object of the present invention to specify a microlubrication system which is improved in terms of control and monitoring.

According to the invention, this object may be achieved by a system specified in the introduction, in the case of which:
 c) the rotary feedthrough and/or the metering valve are designed as smart components.

The inventors recognized that the use of smart components in a microlubrication system makes it possible for the ratio of lubricant and air to be controlled better, without an excessive increase in the outlay for controlling and monitoring and above all for maintaining the various components.

The term "a smart component" is to be understood as meaning components which are provided with associated sensors and electronics. Unlike in the procedure which is otherwise routine in machining units, in this case the proper operation or other parameters of the components are detected directly at the components, and not via separate sensors of a superordinate system control. Instead, the logic and intelligence for controlling and monitoring the smart component are brought into a direct relationship therewith. In particular, the actual sensor signals are evaluated directly in the associated electronics, which then for their part only transmit corresponding communication data and end results, such as for example an error code in the event of failure of the component, to the superordinate system control.

The superordinate system control is simplified as a result, since no information relating to the precise configuration and internal operations of the components have to be stored therein. As a whole, the installation, operation and maintenance of the system as a whole is simplified by the integration of expert knowledge about the individual components in the latter themselves.

The metering valve preferably has an associated sensor and control unit having a dedicated microprocessor, which can independently detect and evaluate the operating state of the metering valve.

In this case, the sensor and control unit can have a circuit, in particular a shunt or a Hall sensor, with which the current profile across a magnet coil of the metering valve during opening of the metering valve can be detected. The microprocessor can evaluate said current profile in order to determine a lubricant pressure bearing against the metering valve and/or the viscosity of the lubricant. In this way, there is no need for any external sensors or measuring devices with which the lubricant pressure or the viscosity are determined. Furthermore, electrical influences of the supply lines on the magnet coils can be compensated for without preceding calibration.

The sensor and control unit can be designed in such a manner that it performs a metering correction, in particular adapts the opening time of the metering valve, depending on the lubricant pressure and/or the viscosity of the lubricant. In this way, the superordinate system control can transfer a desired metering for the lubricant to the metering valve only the on account of other parameters of the machining unit, such as for example the tool used, the material to be machined, the cutting speed, etc. The logic associated with the smart component then ensures that the desired metering is maintained even given changing lubricant pressures and/or viscosity.

The rotary feedthrough, too, can have an associated sensor and control unit having a dedicated microprocessor, which can independently detect and evaluate the operating state of the rotary feedthrough.

The sensor and control unit of the rotary feedthrough can in this case comprise at least one of the following sensors: an air pressure sensor for the incoming air pressure; an air pressure sensor for the air leakage pressure; a sensor for the oil pressure; an optical oil leakage sensor; a rotational speed sensor; a vibration sensor; a temperature sensor. As will be explained in more detail further below, each sensor covers other partial aspects for monitoring the rotary feedthrough. It is therefore particularly advantageous if all of these sensors are provided.

The smart components can have a preferably non-volatile data storage device, in which evaluation data can be stored. As a result, it is possible in particular with a view to wear to monitor a chronological development of the values determined, for example when storing the amplitude of vibration frequencies, which indicate bearing damage.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

Hereinbelow, the invention will be explained on the basis of an exemplary embodiment with reference to the drawings, in which.

DETAILED DESCRIPTION OF A PREFERRED EXEMPLARY EMBODIMENT

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Figure 1:
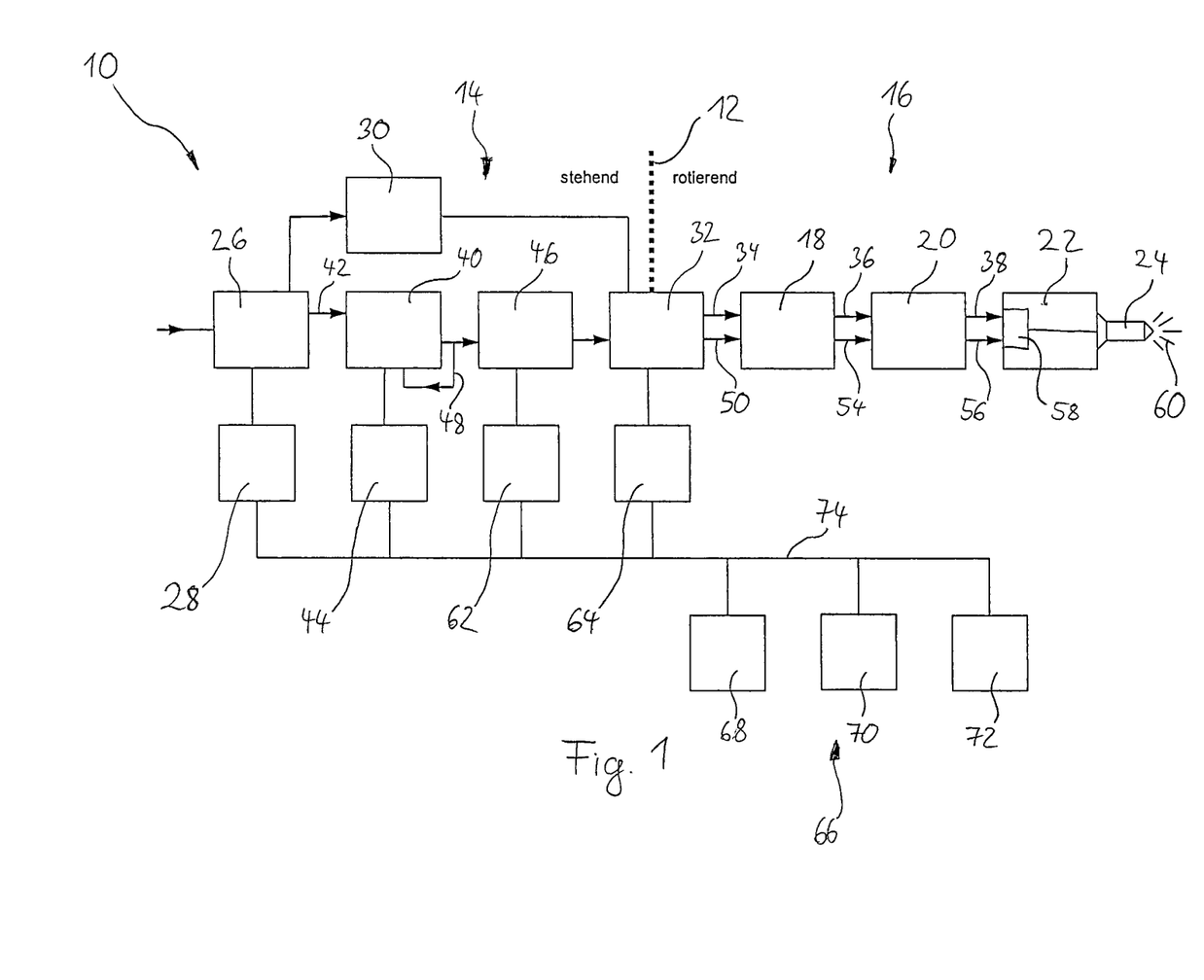
FIG. 1 shows a schematic illustration of a microlubrication system on a machining unit having a rotating tool.

FIG. 1 shows, as an example of a microlubrication system, a microlubrication device, denoted as a whole by 10, in a machining unit not described in further detail, for example in a CNC milling machine.

As is illustrated by a dashed perpendicular line 12, the machining unit can be divided schematically substantially into a stationary part 14 and a rotating part 16.

The rotating part 16 comprises all of the components which rotate during operation of the machining unit.

These are primarily a spindle 18, a transfer unit 20 connected thereto, and a tool holder 22, in which the actual machining tool 24, for example a drill or a milling cutter, is locked.

A drive (not shown) for the spindle 16 is arranged in the stationary part 14 of the machining unit. Furthermore, provision is made of drives which, depending on the type of machining unit, either move the workpiece to be machined in relation to the spindle 18 or the machining tool 24, or conversely move the spindle 18 or the machining tool 24 in relation to the workpiece. To this extent, the term "stationary" is therefore to be understood only in relation to the rotating spindle 18, since the stationary part 14 is likewise moved in relation to the workpiece, for example via an XYZ table.

In the stationary part 14 of the machining unit, the microlubrication device 10 firstly has a pneumatic unit 26, which is supplied at the input side with compressed air. At the output side, the pneumatic unit 26 supplies compressed air at a variable air pressure. To this end, the pneumatic unit 26 is connected to a sensor and control unit 28.

Subsequently, the pneumatic unit 26 is connected to an air valve 30.

Downstream, the air valve 30 is connected to a rotary feedthrough 32, which is embodied in such a manner that the compressed air is forwarded into an air guiding duct 34 of the rotating spindle 18. The air guiding duct 34 of the spindle 18 is adjoined by corresponding air guiding ducts 36, 38 in the transfer unit 20 and the tool holder 22.

Furthermore, in the stationary part 14 of the machining unit, the microlubrication device 10 has an oil conveyor 40, with which a variable oil pressure is generated from an oil supply (not shown). In the example shown here, the oil conveyor 40 is connected on the input side to the pneumatic unit 26 via a reference pressure line 42, in order to set a reference pressure point for the oil conveyor 40.

However, the reference pressure point can also be transmitted to the oil conveyor 40 exclusively using electronic means. To this end, the oil conveyor 40 is likewise connected to an associated sensor and control unit 44.

On the output side, the oil conveyor 40 is connected to an electrically controllable metering valve 46, which is preferably in the form of a non-proportional fast-action valve. The connection in this case comprises a loop line 48, returning to the oil conveyor 40, for avoiding air bubbles in the oil present before the metering valve 46.

On the output side, the metering valve 46 is likewise connected to the rotary feedthrough 32, which is embodied in such a manner that the oil is forwarded, separately from the compressed air, into an oil guiding duct 50 of the rotating spindle 18.

Corresponding further oil guiding ducts 52 and 54 run, separately from the air guiding ducts 34, 36, 38, to the transfer unit 20 and to the tool holder 22.

It is only in the tool holder 22 that provision is made of a mixing chamber 58, in which the oil and the compressed air are combined. The mixing chamber 58 has a mixing chamber output, which is connected to one or more ducts of the tool 24 itself, such that the oil is guided up to the cutting region of the tool 24, where it emerges as a lubricant cloud 60.

The proportion of the oil in the lubricant cloud 60 can be controlled substantially with the aid of the metering valve 46. This is done by varying the ratio between opening pulse duration and closing pulse duration of the metering valve 46.

According to the invention, the rotary feedthrough 32 and also the metering valve 46 are designed as smart components. This means that these components have dedicated associated sensor and control units 62 and 64. Each of these sensor and control units 62 and 64 has a dedicated microprocessor, which processes the output signals of the sensors and transmits corresponding communication signals to a superordinate system control 66.

In the present example, the system control 66 comprises a control computer 68, a user interface 70 and an Internet access 72. The individual components are coupled in this case via a data link 74 (e.g. Ethernet or WLAN).

As essential components of the microlubrication device 10, the rotary feedthrough 32 and the metering valve 46 are shown in greater detail again as a structural unit 80 in FIGS. 2 to 10.

Figure 2:
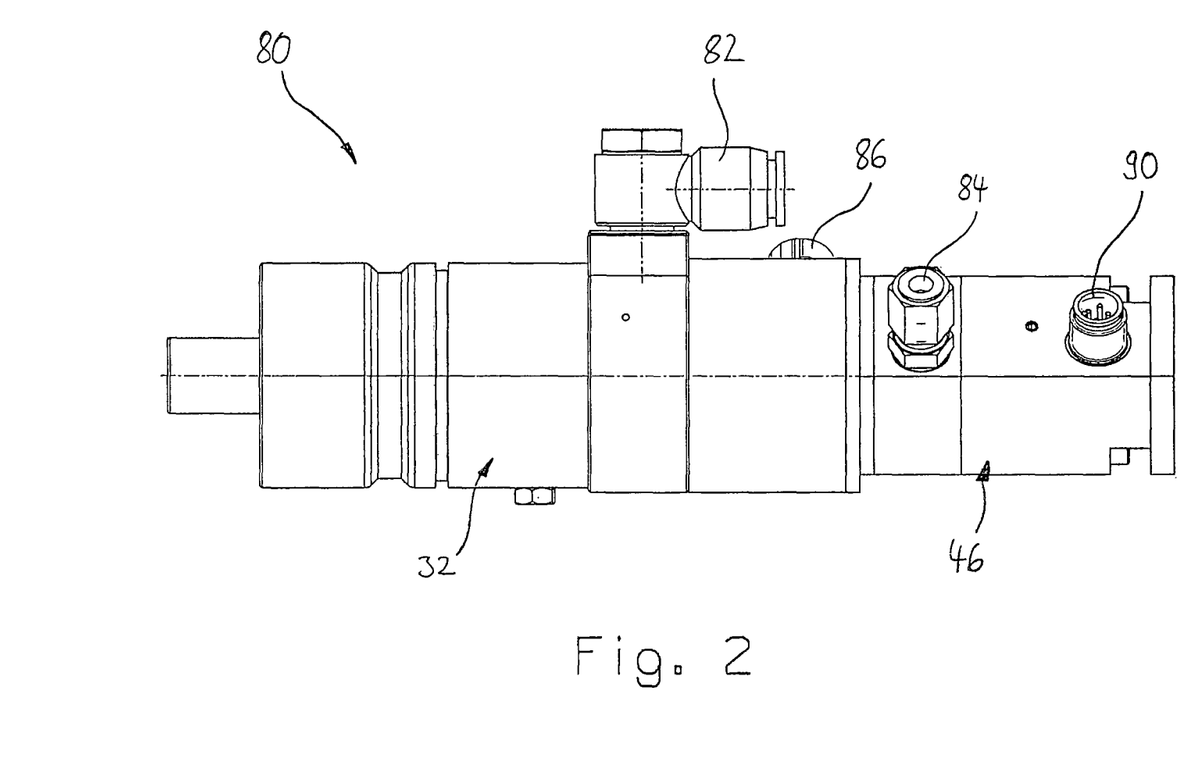
FIG. 2 shows a front view of a structural unit of the microlubrication system, which has a rotary feedthrough and a metering valve.
Figure 3:
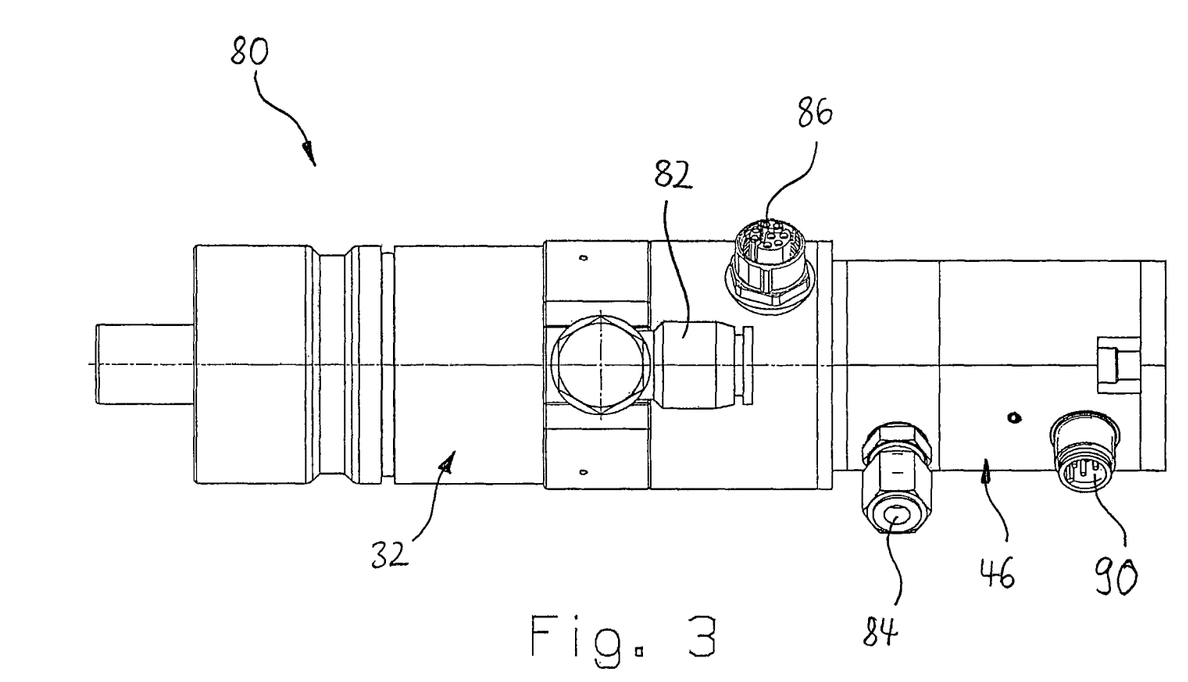
FIG. 3 shows a plan view onto the structural unit shown in FIG. 2.

FIG. 2 shows this structural unit 80 in a side view, with the rotary feedthrough 32 facing toward the rotating part 16 of the machining unit being arranged on the left in the drawing.

This view shows a compressed air connection 82 on the rotary feedthrough 32 and an oil connection 84 on the metering valve 46.

Furthermore, a data connection 86 is provided directly on the rotary feedthrough 32, since the associated sensor and control unit 64 is part of the structural unit 80.

In contrast thereto, a control card 88 separate from the structural unit 80 is provided for the metering valve 46 (cf. FIG. 4) and is connected to a control card connection 90 of the metering valve 46. The control card 88 itself comprises a power supply connection 92, a valve connection 94, which is connected to the control card connection 90 of the metering valve 46, and likewise a data connection 96 for integration into the data link 74.

Figure 5:
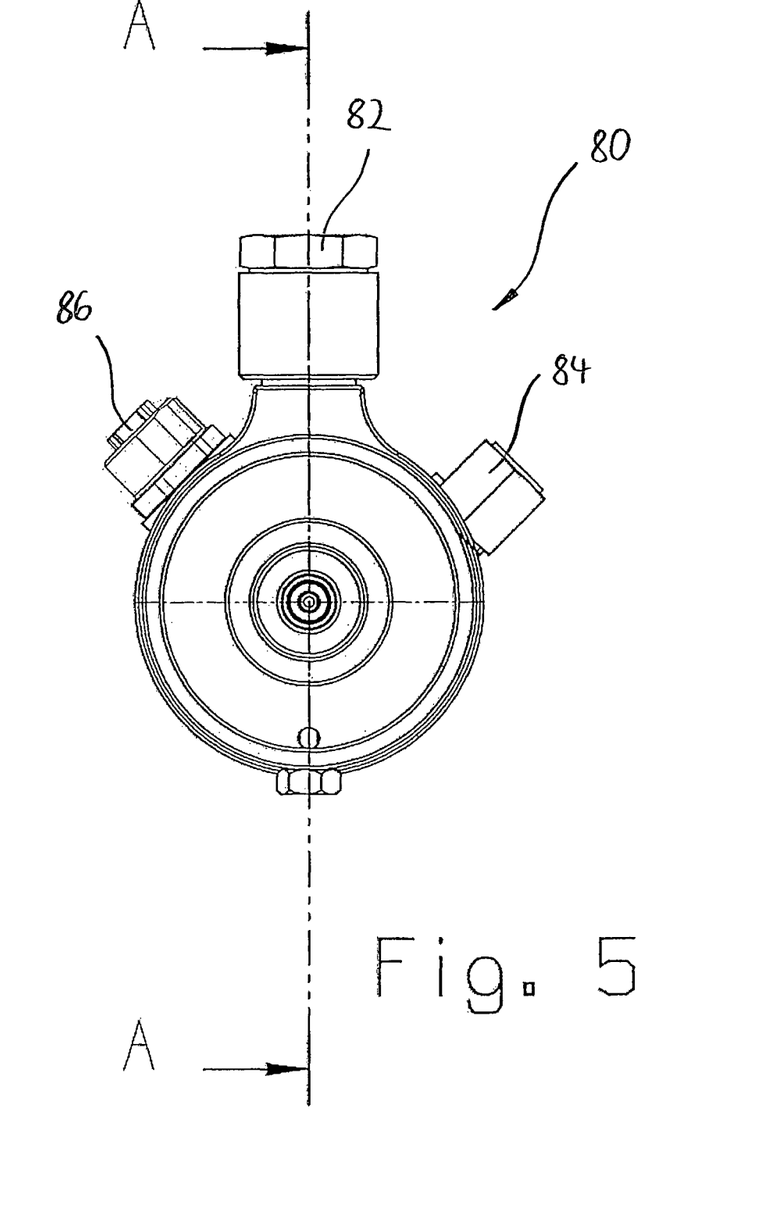
FIG. 5 shows a side view from the left onto the structural unit shown in FIGS. 2 and 3.
Figure 6:
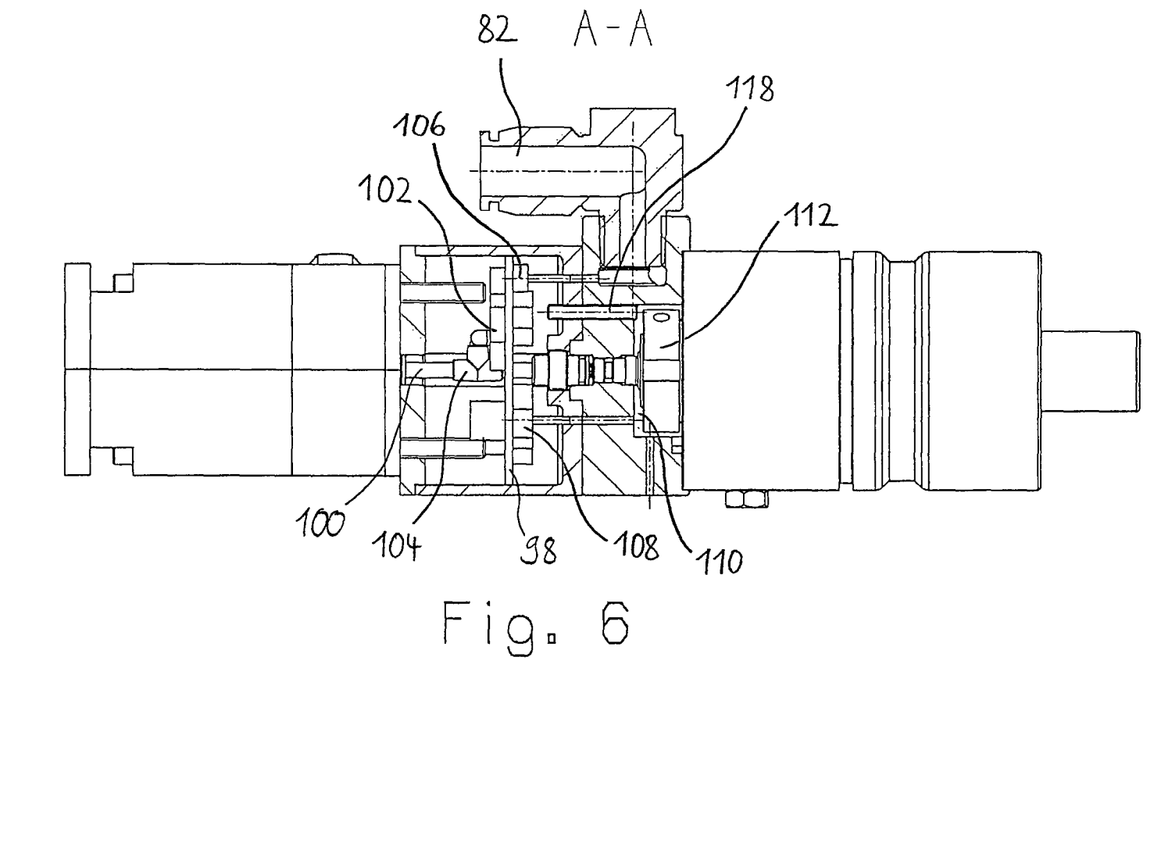
FIG. 6 shows a partial section of the structural unit along the sectional line A-A shown in FIG. 5.
Figure 7:
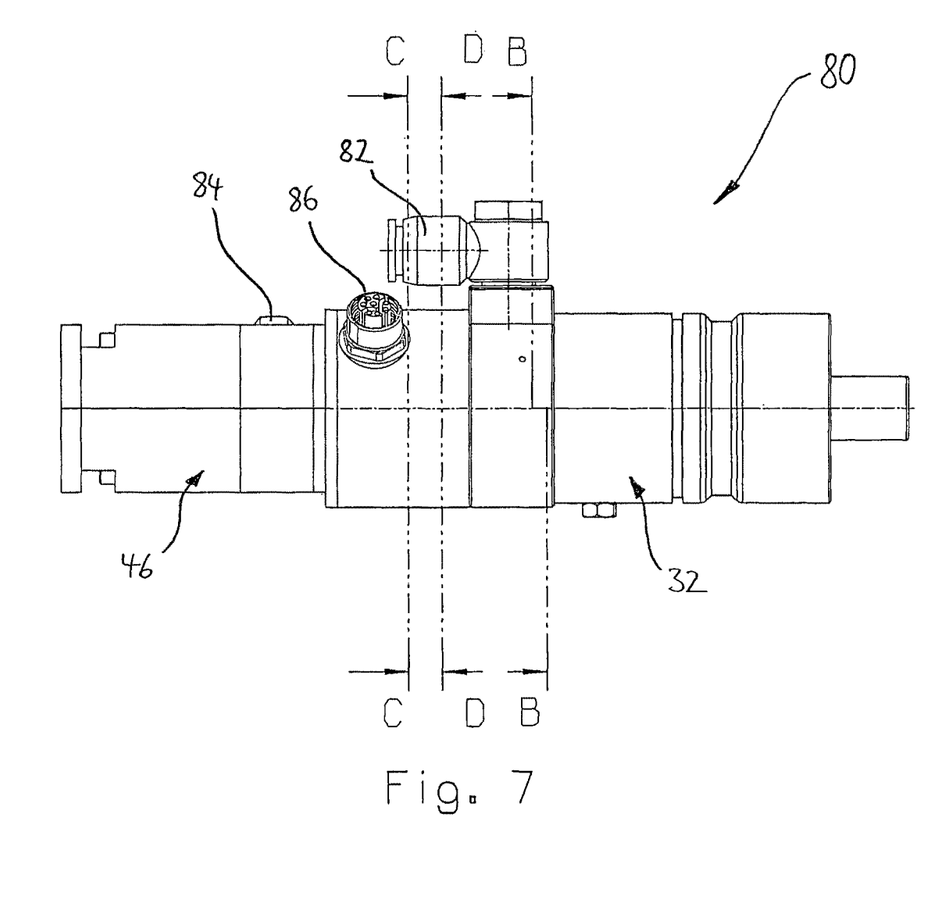
FIG. 7 shows a rear view of the structural unit.
Figure 8:
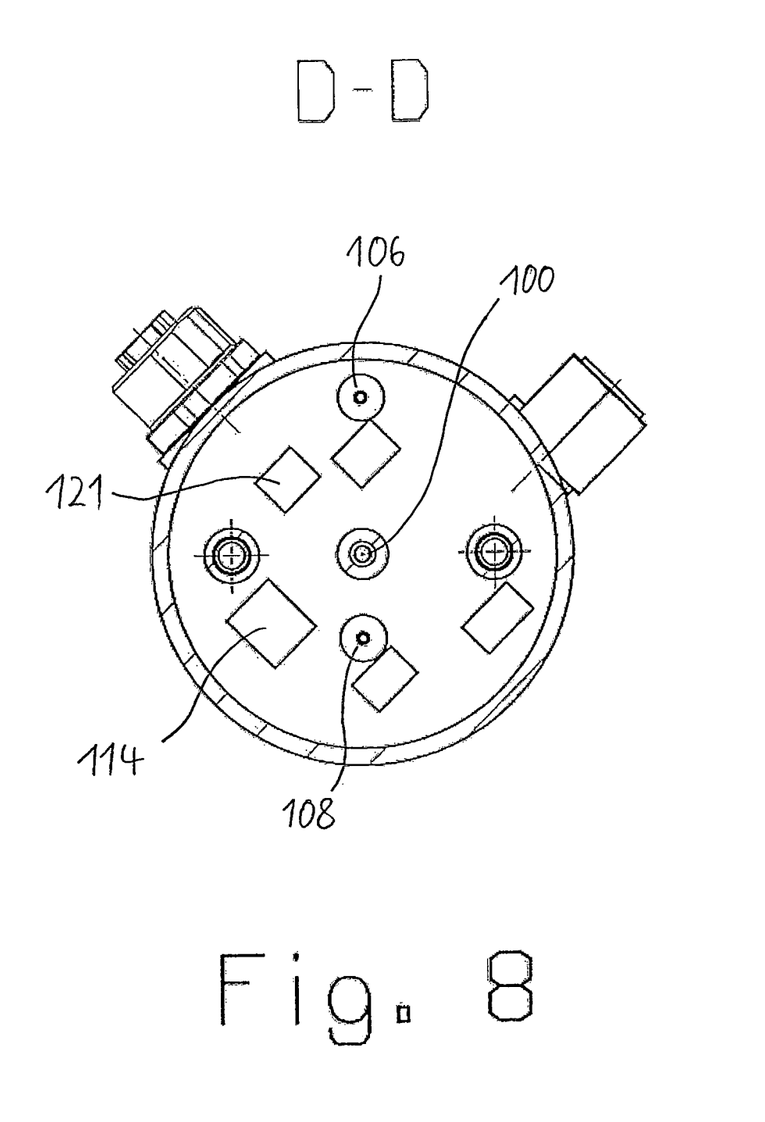
FIG. 8 shows a partial section of the structural unit along the sectional line B-B shown in FIG. 7.
Figure 9:
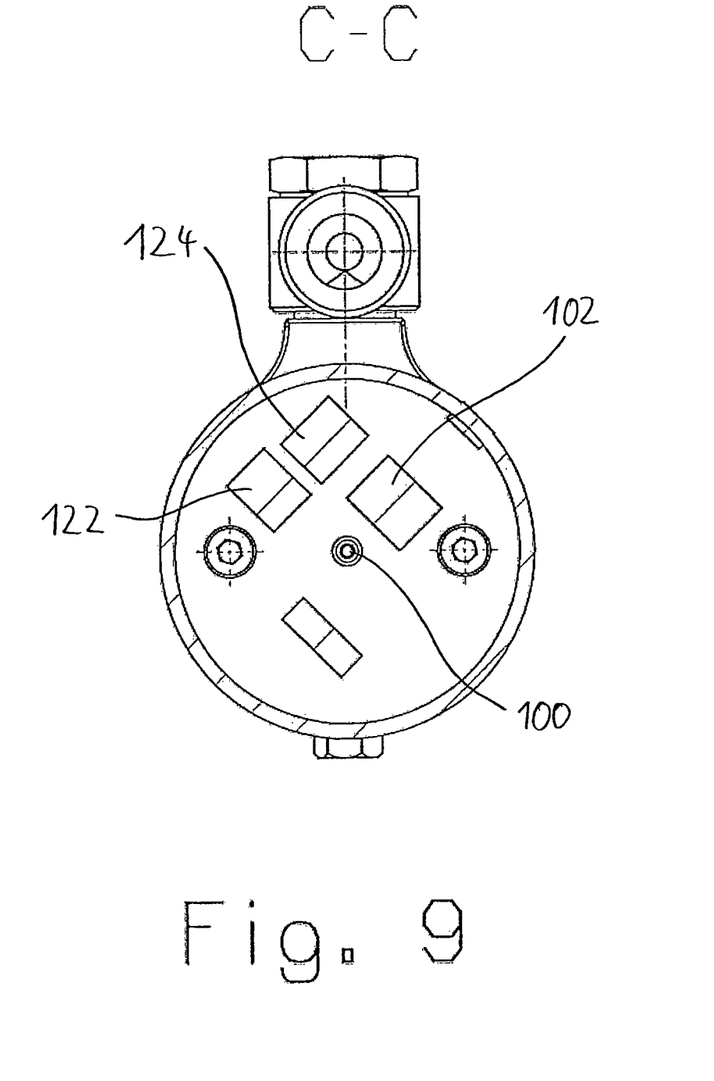
FIG. 9 shows a partial section of the structural unit along the sectional line C-C shown in FIG. 7.
Figure 10:
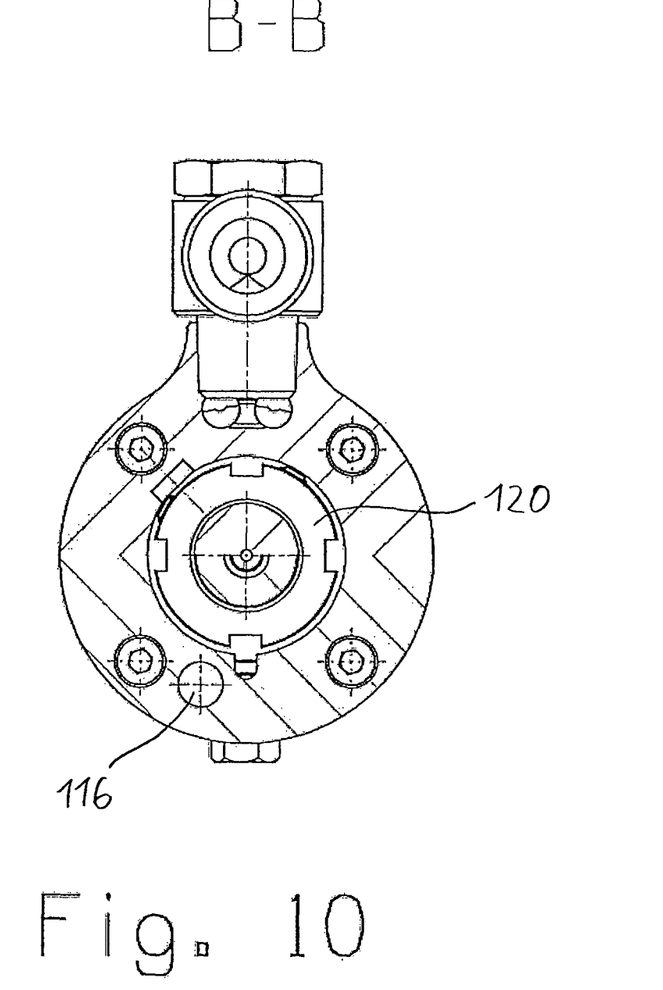
FIG. 10 shows a partial section of the structural unit along the sectional line D-D shown in FIG. 7.

Sectional lines are marked in FIGS. 5 and 7, with the associated sections thereof being illustrated in FIGS. 6, 8, 9 and 10. These sections show details of the rotary feedthrough 32 and of the associated integrated sensor and control unit 64.

The sensor and control unit 64 has a printed circuit board 98, which is arranged about an oil guiding duct 100 in the transverse direction.

The printed circuit board 98 carries an oil pressure sensor 102, which is connected to the oil duct 100 via a branch piece 104.

Furthermore, on the opposing side, the printed circuit board 98 carries a first air pressure sensor 106, which is connected directly to the compressed air connection 82. A second air pressure sensor 108 is connected to a leakage chamber 110, in which there is arranged a slotted nut 112 which axially holds together the bearing elements (not shown) of the rotary feedthrough 32.

In addition, the printed circuit board 98 carries a temperature sensor 114, a vibration sensor 116 and an optical oil leakage sensor 118. The optical oil leakage sensor 118 is in this case arranged at the edge of the leakage chamber 110 and measures the change in light reflex by oil which is present and which, on account of the rotational movement of the slotted nut 112 in the leakage chamber 110 and the associated rotational movement of the air, is displaced to the edge.

Finally, the printed circuit board 98 carries a coil 120, which cooperates with the magnetized slotted nut 112 in order to determine the rotational speed of the rotary feedthrough 32 and in order to obtain power for supplying the active electronic components. These also include a microcontroller 122 and also a non-volatile data storage device 124, such as for example a flash RAM.

During operation of the machining unit, the microlubrication device 10 operates as follows:

The air valve 30 is opened, as a result of which the compressed air passes via the rotary feedthrough 32, the spindle 18 and the transfer unit 20 into the mixing chamber 58 of the tool holder 22.

To add the oil, the metering valve 46, which is an electrically controllable solenoid valve of which the valve element is pressed against the valve seat by the prevailing oil pressure in the closed state, is then opened in short pulses depending on the machining parameters of the machining unit.

Figure 11:
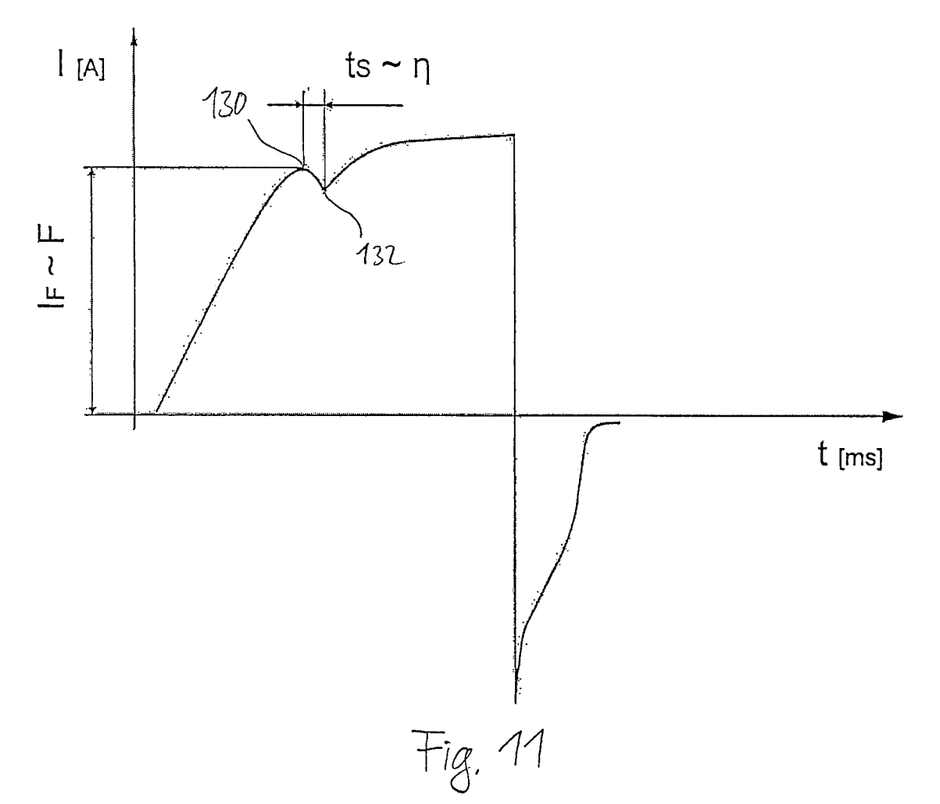
FIG. 11 shows a graph of a typical current profile at the metering valve.

FIG. 11 shows the current profile at the coil of the solenoid valve when the opening voltage is applied. Firstly, the current I increases until, at $I=I_F$, a sufficient magnetic force is reached, at which the valve element lifts off from the valve seat. This force is proportional to the oil pressure present at the valve element.

After the valve element has lifted off from the valve seat, an oil pressure likewise bears on the opposing side of the valve element, as a result of which the force required to move the valve element is reduced again. On account of the magnetic counterforce generated by the movement, the current I at the coil then declines, while the valve element moves into its stop position. As soon as the valve element has reached said stop position, the current increases again up to a constant maximum value.

The time is which the valve element requires from lifting off from the valve seat until it stops in the stop position is in this case proportional to the viscosity of the lubricant in which the valve element moves. This is because, on account of the oil pressure present on both sides of the valve element, the moving valve element is acted upon substantially by the braking force, caused by the viscosity, and a previously known spring force of the valve.

Figure 4:
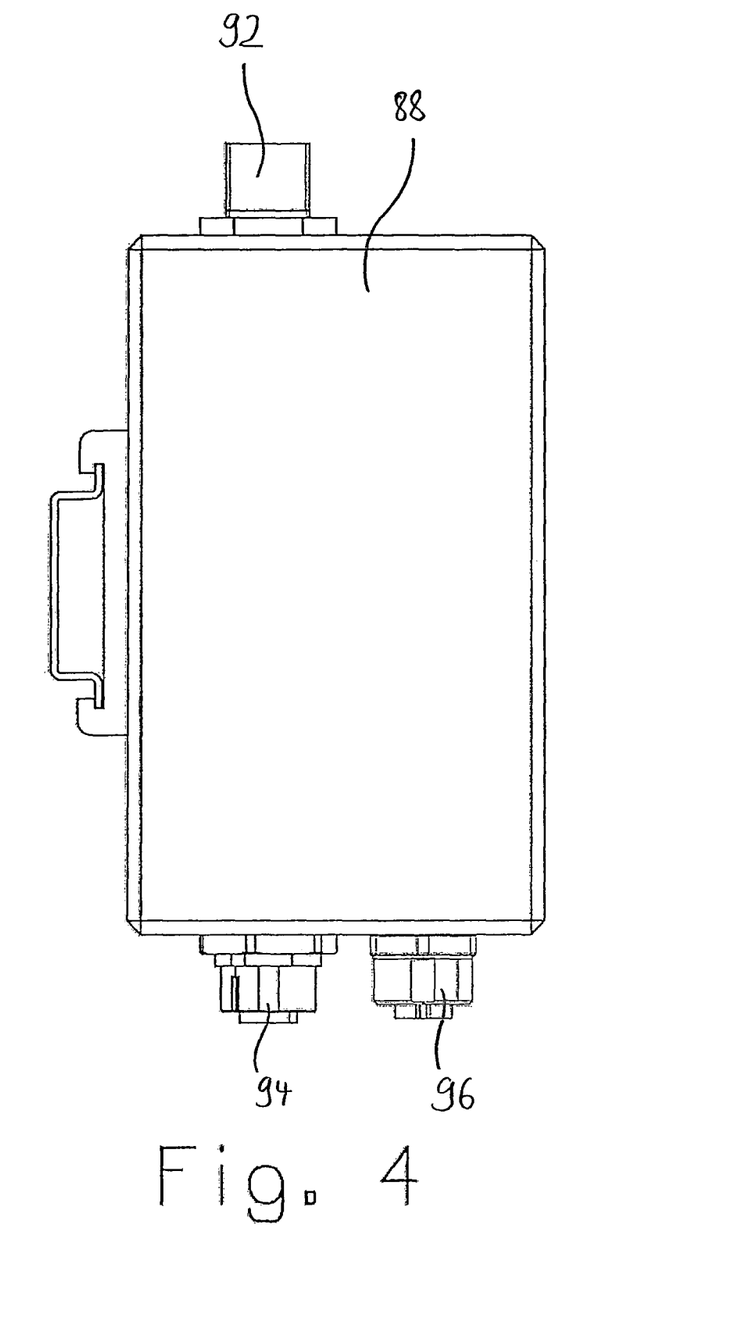
FIG. 4 shows a control card for controlling the structural unit.

The sensor and control unit 62 present in the control card 88 for the metering valve 46 then comprises circuits for detecting the current profile at the coil, for example a shunt. By ascertaining the two turning points 130 and 132, the microprocessor of the sensor and control unit 62 then determines the oil pressure present in front of the metering valve 46 and also the viscosity of the lubricant.

Furthermore, the resistance at the coil can be determined with the aid of the sensor and control unit 62 when the valve element is in the idle state by feeding in a low constant current which does not lead to a movement of the valve element. With a high-impedance circuit, the voltage drop at the coil is ascertained, this in turn being proportional to the resistance of the coil. This resistance is then evaluated for ascertaining the temperature.

In addition, the sensor and control unit 62 can identify incorrect operation of the metering valve 46. By way of example, a considerably increased current flow may indicate a short circuit in the coil of the metering valve 46, or no current flow may indicate a broken cable.

The information which is ascertained is used by the sensor and control unit 62 in order to perform metering corrections directly at the metering valve 46 depending on the oil pressure, the viscosity and the temperature. In this way, the control logic of the system control 66 can be kept streamlined. However, this information can also be transmitted via the data connection 96 to the system control 66, which controls the metering of the oil or varies the oil pressure at the oil conveyor 40 likewise depending on this information in combination with other parameters, such as for example the tool used and the machining speed and/or the air pressure.

Using the Internet access 72, the sensor and control unit 62 of the metering valve 46 can even distribute an error message to the manufacturer, if deviations in the current profile from the conventional current profile which indicate imminent failure of the component are identified. The manufacturer can thereupon proactively initiate the supply of a replacement part.

The rotary feedthrough 32 is monitored by way of its associated sensor and control unit 64, which is flange-mounted onto the mechanical part of the rotary feedthrough 32. In this respect, the monitoring of the rotary feedthrough primarily involves identifying bearing damage.

To this end, the vibration sensor measures the vibrations on the housing of the rotary feedthrough 32. Through suitable filtering during evaluation, it is possible to identify frequencies from the vibrations which are caused essentially by the ball bearings. Changes in the frequencies in question may then indicate damage to the ball bearings. The microcontroller 122 therefore compares current results of the evaluation with results or pre-settings already stored in the data storage device 124. If required, the sensor and control unit 64 distributes, here too via the Internet access 72, corresponding messages to the operator or the manufacturer of the microlubrication device 10, with a service call then being initiated if appropriate.

It is also possible for the temperature sensor 114 to be used for identifying bearing damage, since the temperature of the ball bearings increases in the case of bearing damage. The heat which arises is transferred via the housing to the temperature sensor 114 arranged on the printed circuit board 98, it being possible for the temperature sensor at the same time to identify overheating of the electronics.

The leakage quantities of compressed air and oil which arise at the rotary feedthrough 32 likewise give information about the state of the rotary feedthrough, in particular about the leak-tightness of the transitions from the stationary to the rotating part. The air pressure present at the compressed air connection 82 can be measured by way of the first air pressure sensor 106. The second air pressure sensor 108 can determine the air leakage, with this being assessed in relation to the air pressure at the compressed air connection 82 and the rotational speed, since a higher air pressure and a lower rotational speed result in a higher leakage.

Using all of this information, the sensor and control unit 64 of the rotary feedthrough 32 calculates the remaining service life of the latter, this being transmitted to the system control 66 or if appropriate directly to the manufacturer.

By virtue of the internal power supply, the sensor and control unit 64 can be operated independently without a cable connection, and a readout can be taken only occasionally, for example during servicing. A wireless communication link can also be realized in this way. A power storage device 121 helps to bridge short idle times of the spindle 18.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

What is claimed is:

1. A microlubrication system for a machining unit having a rotating spindle, comprising:
    a) a rotary feedthrough, via which compressed air and lubricant can be fed to the rotating spindle of the machining unit in order to combine them in a mixing chamber close to a tool, and
    b) a metering valve, with which the quantity of the lubricant fed can be metered,
    wherein
    c) the rotary feedthrough and/or the metering valve are designed as smart components, and
    d) the metering valve has an associated sensor and control unit having a dedicated microprocessor, which can independently detect and evaluate the operating state of the metering valve, the wherein the associated sensor and control unit has a circuit with which the current profile across a magnet coil of the metering valve during opening of the metering valve can be detected, and in that the microprocessor evaluates said current profile in order to determine a lubricant pressure bearing against the metering valve and/or the viscosity of the lubricant.

2. The system as claimed in claim 1, wherein the circuit is a shunt or a Hall sensor.

3. The system as claimed in claim 1, wherein the sensor and control unit is designed in such a manner that it performs a metering correction, which adapts the opening time of the metering valve, depending on the lubricant pressure and/or the viscosity of the lubricant.

4. The system as claimed in claim 1, wherein the rotary feedthrough has an associated sensor and control unit having a dedicated microprocessor, which can independently detect and evaluate the operating state of the rotary feedthrough.

5. The system as claimed in claim 4, wherein the sensor and control unit of the rotary feedthrough comprises at least one of the following sensors: an air pressure sensor for the incoming air pressure; an air pressure sensor for the air leakage pressure; a sensor for the oil pressure; an optical oil leakage sensor; a rotational speed sensor; a vibration sensor; and/or a temperature sensor.

6. The system as claimed in claim 1, wherein the smart components have a preferably non-volatile data storage device, in which evaluation data can be stored.

7. A method for operating a microlubrication system for a machining unit comprising:
    a) providing a microlubrication system as claimed in claim 1;
    b) activating the microlubrication system;
    c) monitoring the operation of the microlubrication system with the aid of the smart components.

* * * * *